(12) United States Patent
Chang

(10) Patent No.: US 8,952,308 B2
(45) Date of Patent: Feb. 10, 2015

(54) LIGHT SOURCE SENSING DEVICE AND LIGHT SOURCE SENSING METHOD THEREOF

(71) Applicant: Wistron Corporation, New Taipei (TW)

(72) Inventor: Kuang-Lan Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 204 days.

(21) Appl. No.: 13/831,736

(22) Filed: Mar. 15, 2013

(65) Prior Publication Data

US 2014/0168456 A1 Jun. 19, 2014

(30) Foreign Application Priority Data

Dec. 17, 2012 (TW) .............................. 101147917 A

(51) Int. Cl.
*G01C 21/02* (2006.01)
*H04N 5/235* (2006.01)

(52) U.S. Cl.
CPC .................................. *H04N 5/2354* (2013.01)
USPC ...................................................... 250/206.3

(58) Field of Classification Search
USPC ........................................... 250/206.1–206.3
See application file for complete search history.

(56) References Cited

U.S. PATENT DOCUMENTS 3,078,372 A 2/1963 Chase et al.
2004/0016865 A1* 1/2004 Little .......................... 250/203.1

FOREIGN PATENT DOCUMENTS

WO 2009087531 7/2009

OTHER PUBLICATIONS

"Office Action of Taiwan Counterpart Application", issued on May 27, 2014, p. 1-p. 7.

* cited by examiner

*Primary Examiner* — Thanh Luu
(74) *Attorney, Agent, or Firm* — Jianq Chyun IP Office

(57) ABSTRACT

A light source sensing device and a light source sensing method thereof are provided. The light source sensing device includes an optical sensor, a rod, a motor and a controller. The optical sensor is used for sensing lighting brightness emitted by the light source. The rod is disposed on a circular track which surrounds the optical sensor. When the light source irradiates the rod, a shadow is formed on a sensing surface of the optical sensor. The motor drives the rod to move along the circular track in a moving speed. The controller is coupled to the motor and the optical sensor, and controls the optical sensor to sample in a sampling frequency during a sampling period for obtaining a plurality of brightness values. The controller calculates and processes the brightness values for obtaining an irradiating angle of the light source.

16 Claims, 7 Drawing Sheets

LIGHT SOURCE SENSING DEVICE AND LIGHT SOURCE SENSING METHOD THEREOF

CROSS-REFERENCE TO RELATED APPLICATION

This application claims the priority benefit of Taiwan application serial no. 101147917, filed on Dec. 17, 2012. The entirety of the above-mentioned patent application is hereby incorporated by reference herein and made a part of this specification.

BACKGROUND

1. Technical Field

The disclosure relates generally to a light source sensing device, and more particularly to a light source sensing device for sensing position information of a light source and a light source sensing method thereof.

2. Related Art

In today's information age, people are becoming more and more dependent on electronic devices. For instance, portable electronic devices with the photo capture function have become indispensable tools in the lives of the modern people. In recent years, the use of all kinds of image capturing devices (e.g. traditional cameras, digital cameras, and mobile phones with image capturing function) has become widespread.

In photography, an exposure operation is typically performed through an auto exposure (AE) function to achieve the ideal brightness for an entire image. When under insufficient ambient lighting or when the exposure time is below a safe shutter speed, the images captured by the image capturing devices become unrecognizable due to inadequate brightness. Therefore, to enhance the photo capturing function of the image capturing device, a flashlight module is typically employed in the image capturing device so as to compensate for the insufficient ambient light with the fill light function of the flashlight module, and thereby obtain images of preferable clarity.

However, when the user uses an image capturing device to shoot under a backlight, even if the ambient light is sufficient, because the captured object or person faces away from the light, the captured object may lack clarity or the captured object or person may be rendered too dark. To capture satisfactory images at this time, the flashlight module needs to be activated to compensate the lighting of the subjects being captured. However, since the image capturing device cannot determine the high contrast effect caused by the light source and the position of the light source, the user needs to enable the flashlight module manually. Moreover, the user cannot specifically compensate the brightness of the dark details. Accordingly, the user can capture highly preferred images if an apparatus is available to assist the image capturing device in the determination of the light source.

SUMMARY

The disclosure provides a light source sensing device and a light source sensing method thereof, capable of obtaining position information and brightness information of the light source from an irradiating angle of the light source calculated according to the lighting brightness sensed by the optical sensor.

The disclosure provides a light source sensing device, including an optical sensor, a rod, a motor, and a controller. The optical sensor senses a lighting brightness emitted by a light source. The rod is disposed on a circular track which surrounds the optical sensor. When the light source irradiates the rod, a shadow is formed on a sensing surface of the optical sensor. The motor is electrically connected to the rod and drives the rod to move along the circular track in a moving speed. The controller is coupled to the motor and the optical sensor. The controller controls the optical sensor to sample in a sampling frequency during a sampling period for obtaining a plurality of brightness values. Moreover, the controller calculates and processes the brightness values for obtaining an irradiating angle of the light source.

According to an embodiment of the disclosure, in the light source sensing device, the controller quantifies the brightness values for obtaining a plurality of brightness sensing values, and obtaining a minimum brightness sensing value from the plurality of brightness sensing values. Moreover, the controller determines whether a sampling position L corresponding to the minimum brightness sensing value is located in a reasonable sampling region. If yes, the controller calculates the irradiating angle of the light source according to the sampling position L.

According to an embodiment of the disclosure, in the light source sensing device, the controller obtains a maximum brightness sensing value from the plurality of the brightness sensing values. The controller calculates a difference between the maximum brightness sensing value and the minimum brightness sensing value to serve as a contrast value.

According to an embodiment of the disclosure, in the light source sensing device, the controller calculates a regional difference value between every two neighboring brightness sensing values. The controller selects a maximum difference value and a minimum difference value from the plurality of regional difference values, and simultaneously obtains a sampling position M corresponding to the maximum difference value and a sampling position N corresponding to the minimum difference value. The controller determines whether an absolute value of the maximum difference value and an absolute value of the minimum difference value are smaller than the contrast value. If not, the controller controls the optical sensor to resample in the sampling frequency.

According to an embodiment of the disclosure, in the light source sensing device, the controller compares the magnitudes of the sampling position M, the sampling position N, and the sampling position L, and the controller accordingly determines whether the sampling position L is located in the reasonable sampling region.

According to an embodiment of the disclosure, the light source sensing device is coupled to an image capturing device, wherein the controller determines whether the contrast value is greater than a threshold value. If the contrast value is greater than the threshold value, the controller enables a fill light unit of the image capturing device and adjusts a fill light direction of the fill light unit according to the irradiating angle of the light source.

According to an embodiment of the disclosure, the controller performs a Hilbert transform on the brightness values to remove noise.

The disclosure provides a light source sensing method adapted for a light source sensing device having an optical sensor. The optical sensor senses a lighting brightness emitted by a light source. The light source sensing method includes the following steps. A rod is driven to move along a circular track which surrounds the optical sensor. When the light source irradiates the rod, a shadow is formed on a sensing surface of the optical sensor. The optical sensor samples the sensed lighting brightness in a sampling frequency during a sampling period for obtaining a plurality of brightness values.

The controller calculates and processes the brightness values for obtaining an irradiating angle of the light source.

In summary, in the light source sensing device and the light source sensing method according to embodiments of the disclosure, the motor drives the rod to move along the circular track which surrounds the optical sensor. Simultaneously, the optical sensor samples the sensed lighting brightness in the sampling frequency, and the brightness values are calculated and processed for obtaining the irradiating angle of the light source. Accordingly, only simple detection devices are needed to obtain the positional information of the light source, and thereby understand where the light is originated.

Several exemplary embodiments accompanied with figures are described in detail below to further describe the disclosure in details.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

When the sun shines obliquely, a shadow is formed besides any rod. The direction in which the sun irradiates the rod can be determined in accordance to the position of the shadow. Embodiments of the disclosure employ this characteristic and configure a rod besides an optical sensor. Moreover, the rod is driven to move around the optical sensor, and the position of the sun light source is determined by the shadow of the rod formed on the optical sensor. In order to make the disclosure more comprehensible, embodiments are described below as the examples to show that the disclosure can actually be realized.

Figure 1A:
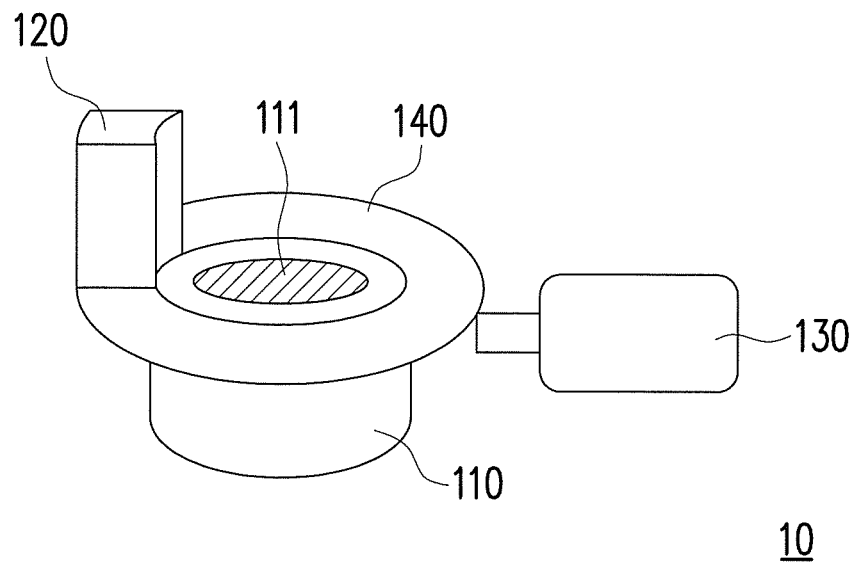
FIG. 1A is a schematic application side view of a light source sensing device according to an embodiment of the disclosure.
Figure 1B:
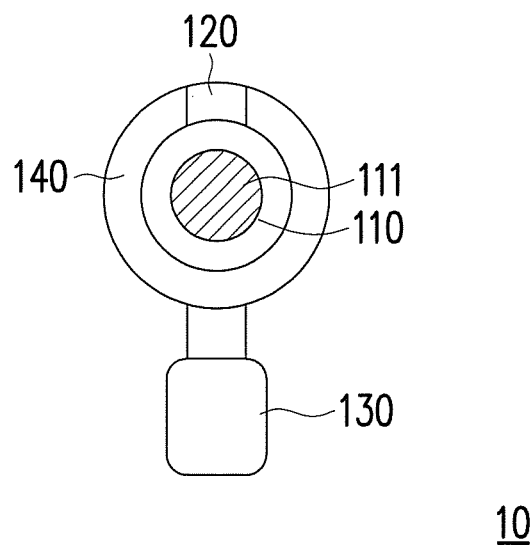
FIG. 1B is a schematic application top view of a light source sensing device according to an embodiment of the disclosure.

FIG. 1A is a schematic application side view of a light source sensing device according to an embodiment of the disclosure. FIG. 1B is a schematic application top view of a light source sensing device according to an embodiment of the disclosure. With reference to FIGS. 1A and 1B, a light source sensing device 10 of the present embodiment includes an optical sensor 110, a rod 120, a motor 130, and a circular track 140. Moreover, the light source sensing device 10 further includes a controller (not drawn in FIGS. 1A and 1B). The controller is coupled to the motor 130 and the optical sensor 110 to control the optical sensor 110 and the motor 130. When the motor 130 is activated by control from the controller, the motor 130 drives the rod 120 to begin rotating along the circular track 140 in a moving speed. Assuming the irradiation direction of the light source remains constant and the rod 120 moves along the circular track 140, a position of a shadow formed on a sensing surface 111 when the light source irradiates the rod 120 also changes correspondingly. Therefore, the lighting brightness sensed by the optical sensor 110 changes due to the variation of the shadow positions. After sampling and processing the lighting brightness sensed by the optical sensor 110, an irradiating angle of the light source can be determined.

Figure 2A:
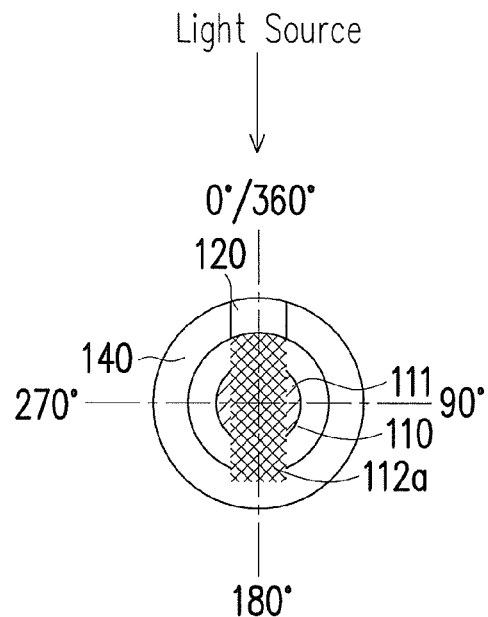
FIG. 2A is a schematic view of a light source sensing device determining an irradiating angle of a light source according to an embodiment of the disclosure.
Figure 2B:
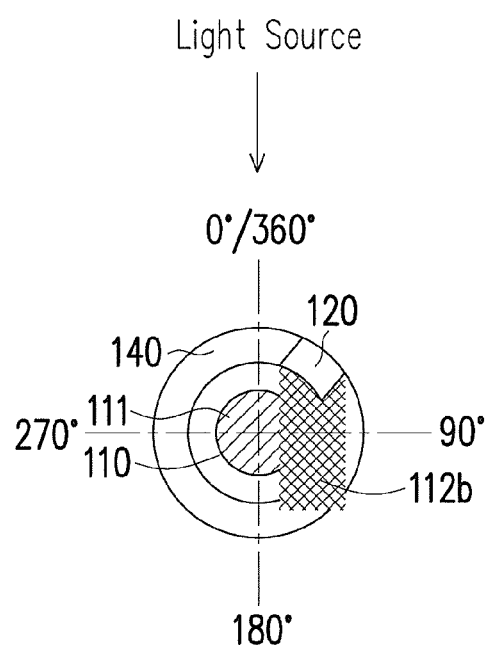
FIG. 2B is a schematic view of a light source sensing device determining an irradiating angle of a light source according to an embodiment of the disclosure.

FIGS. 2A and 2B are schematic views of a light source sensing device determining an irradiating angle of a light source according to an embodiment of the disclosure. With reference to FIGS. 2A and 2B, when the irradiating angle of the light source is 0 degree, and the rod 120 is located at an angular position of 0 degree, the rod 120 forms a shadow region 112a. At this time, an overlapping area of the shadow region 112a and the sensing surface 111 is at a maximum. In other words, the light irradiating from the light source on the sensing surface 111 is mostly blocked by the rod 120, and so the lighting brightness sensed by the optical sensor 110 is at a minimum. When the rod 120 begins to move to other angles, the lighting brightness sensed by the optical sensor 110 changes. For example, as shown in FIG. 2B, when the rod 120 begins to move to an angular position of 45 degrees, the rod 120 forms a shadow region 112b. An overlapping area of the shadow region 112b and the sensing surface 111 is smaller than the overlapping area of the shadow region 112a and the sensing surface 111. At this time, the lighting brightness sensed by the optical sensor 110 is greater than the lighting brightness sensed when the rod 120 is located at the 0 degree angular position.

Therefore, when the angular position of the rod 120 is the same as the irradiating angle of the light source, the lighting brightness sensed by the optical sensor 110 is at a minimum. Accordingly, the irradiating angle of the light source can be determined by the lighting brightness sensed by the optical sensor 110. Moreover, it should be noted that, the angles in the afore-described embodiments are not limited by the foregoing description. It is to be understood that the foregoing embodiments are exemplary, such that the angular values can be assumed in accordance with an actual requirement, and the disclosure is not limited thereto.

Figure 3:
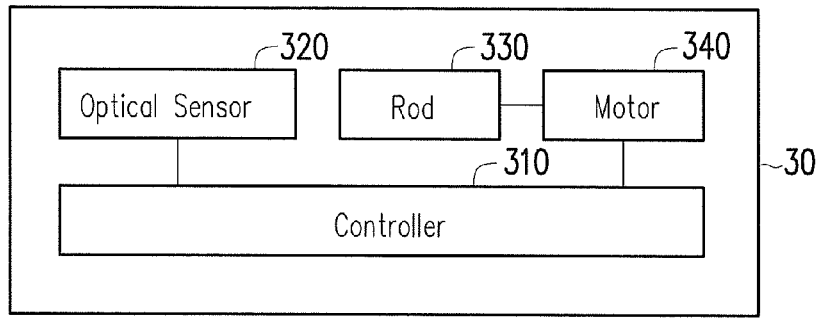
FIG. 3 is a block diagram of a light source sensing device according to an embodiment of the disclosure.

FIG. 3 is a block diagram of a light source sensing device according to an embodiment of the disclosure. With reference to FIG. 3, a light source sensing device 30 of the present embodiment includes an optical sensor 320, a rod 330, a motor 340, and a controller 310. The optical sensor 320 may be a device capable of sensing an ambient light variation, and the optical sensor 320 is used for sensing the lighting brightness emitted by the light source. The rod 330 is disposed on a circular track (not drawn in FIG. 3) which surrounds the optical sensor 329, in which when the light source irradiates the rod 330, a shadow is formed on a sensing surface of the optical sensor 320.

The motor 340 provides a motive force to the rod 330 for driving the rod 330 to move along the circular track in a moving speed. The controller 310 is coupled to the motor 340 and the optical sensor 320. The controller 310 may be a device having a computing function such as a central processor, a chipset, a microprocessor, an embedded controller, and the disclosure is not limited thereto. The controller 310 controls the optical sensor 320 to sample in a sampling frequency during a sampling period for obtaining a plurality of brightness values. Moreover, the controller 310 performs computational processing on the brightness values for obtaining an irradiating angle of the light source.

However, the computational processing on the brightness values performed by the controller 310 can be implemented in a variety of methods according to an actual requirement. The following embodiments described below illustrate how the brightness values are used to determine the irradiating angle of the light source.

Figure 4:
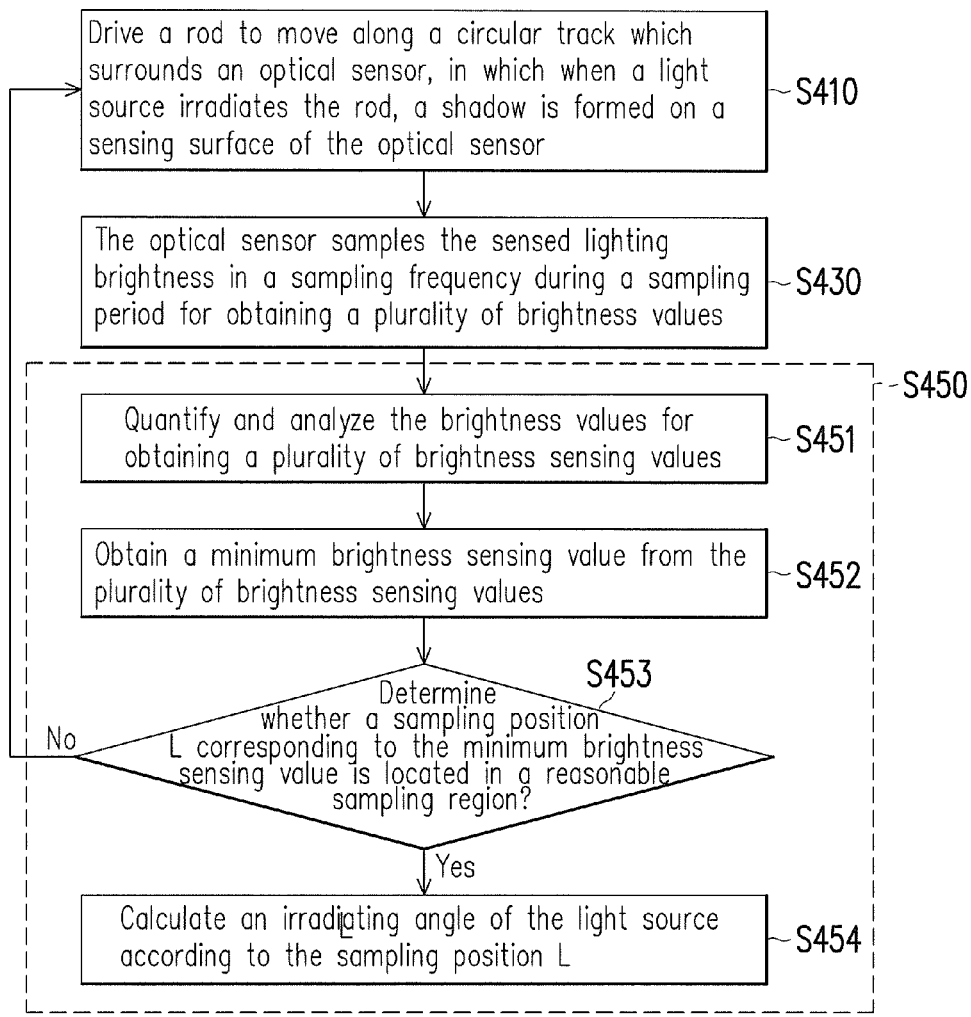
FIG. 4 is a flow diagram of a light source sensing method according to an embodiment of the disclosure.

FIG. 4 is a flow diagram of a light source sensing method according to an embodiment of the disclosure. The method described in the present embodiment may be adapted for the light source sensing device 30 of FIG. 3. The detailed steps of the light source sensing method in the present embodiment are described below with reference to the elements in the light source sensing device 30.

In Step S410, the motor 340 drives the rod 330 to move along the circular track, in which when the light source irradiates the rod 330, a shadow is formed on the sensing surface 111 of the optical sensor 320. In Step S430, the optical sensor 320 samples the sensed lighting brightness in a sampling frequency during a sampling period for obtaining a plurality of brightness values. In Step S450, the controller 310 calculates and processes the brightness values for obtaining an irradiating angle of the light source.

In specifics, when the controller 310 controls the motor 340 to provide a motive force to the rod 330, the rod 330 moves along the circular track in a constant moving speed, in which a time needed for the rod 330 to make a revolution around the optical sensor 320 is t. At this time, the controller 310 simultaneously controls the optical sensor 320 to sample the sensed lighting brightness in a sampling frequency f for obtaining a plurality of brightness values. Therefore, when the rod 320 makes a revolution around the optical sensor 320, the optical sensor 320 can obtain (f*t) brightness values through sampling, in which each of the brightness values respectively corresponds to a sampling position. In other words, the optical sensor 320 executes a sampling operation whenever the rod moves by (360 degrees/sampling frequency) degrees.

For example, assume the rod 330 needs one second to make a revolution around the optical sensor 320, and the optical sensor 320 samples in a sampling frequency of 36 times per second. Therefore, when the rod 330 makes a revolution around the optical sensor 320, the optical sensor 320 can obtain 36 brightness values. Moreover, assume an original movement position of the rod 330 is at the 0 degree angular position. Accordingly, the brightness value of a sampling position 1 corresponds to the brightness value sampled by the optical sensor 320 when the rod 330 moves to the 10 degrees angular position. Similarly, the brightness value of a sampling position 2 corresponds to the brightness value sampled by the optical sensor 320 when the rod 330 moves to the 20 degrees angular position. Therefore, there is a corresponding relationship between the sampling position of each brightness value and the angular position of the rod 330.

Furthermore, according to the relationship between the irradiating angle of the light source and the magnitude of the lighting brightness sensed by the optical sensor 320 in the foregoing description, it can be known that when the angular position of the rod 330 and the irradiating angle of the light source are the same, the optical sensor 320 senses a minimum lighting brightness. Accordingly, the Step S450 in which the controller 310 calculates and processes the brightness values for obtaining an irradiating angle of the light source can be further divided into 4 sub-steps S451-S454.

In Step S451, the controller 310 quantifies and analyzes the brightness values for obtaining a plurality of brightness sensing values. In specifics, the optical sensor 320 has an initialized minimum value V and a maximum value U. However, for a typical sensor, the range between the upper and lower boundaries cannot be easily computed. For example, the minimum value V may be 32, and the maximum value U may be 25565, and accordingly, the range between the minimum value V to the maximum value U is a numerical range which cannot be easily computed. Therefore, in the quantifying step, the brightness values sensed by the optical sensor 320 are quantified within a range that is easy to compute. For example, if the brightness values are to be quantified in a range from 0-100, the quantification can be achieved by using an equation [brightness values*100/(U−V)]. Accordingly, the brightness values can be transformed between a numerical range of 0-100.

In Step S452, the controller 310 obtains a minimum brightness sensing value from the plurality of brightness sensing values. In Step S453, the controller 310 determines whether a sampling position L corresponding to the minimum brightness sensing value is located in a reasonable sampling region. If yes, in Step S454, the controller 310 calculates the irradiating angle of the light source according to the sampling position L. In other words, the angle converted by using the sampling position L corresponding to the minimum brightness sensing value is set as the irradiating angle of the light source. If the sampling position L corresponding to the minimum brightness sensing value is not limited in the reasonable sampling region, the controller 310 controls the motor 340 to drive the rod 330 again, and controls the optical sensor 320 to sample again in the same sampling frequency. Accordingly, by finding a reasonable minimum brightness sensing value in the plurality of brightness sensing values, and using the sampling position L corresponding to the minimum brightness sensing value, the controller 310 can determine the angular position of the rod 330 and the irradiating angle of the light source.

Figure 5:
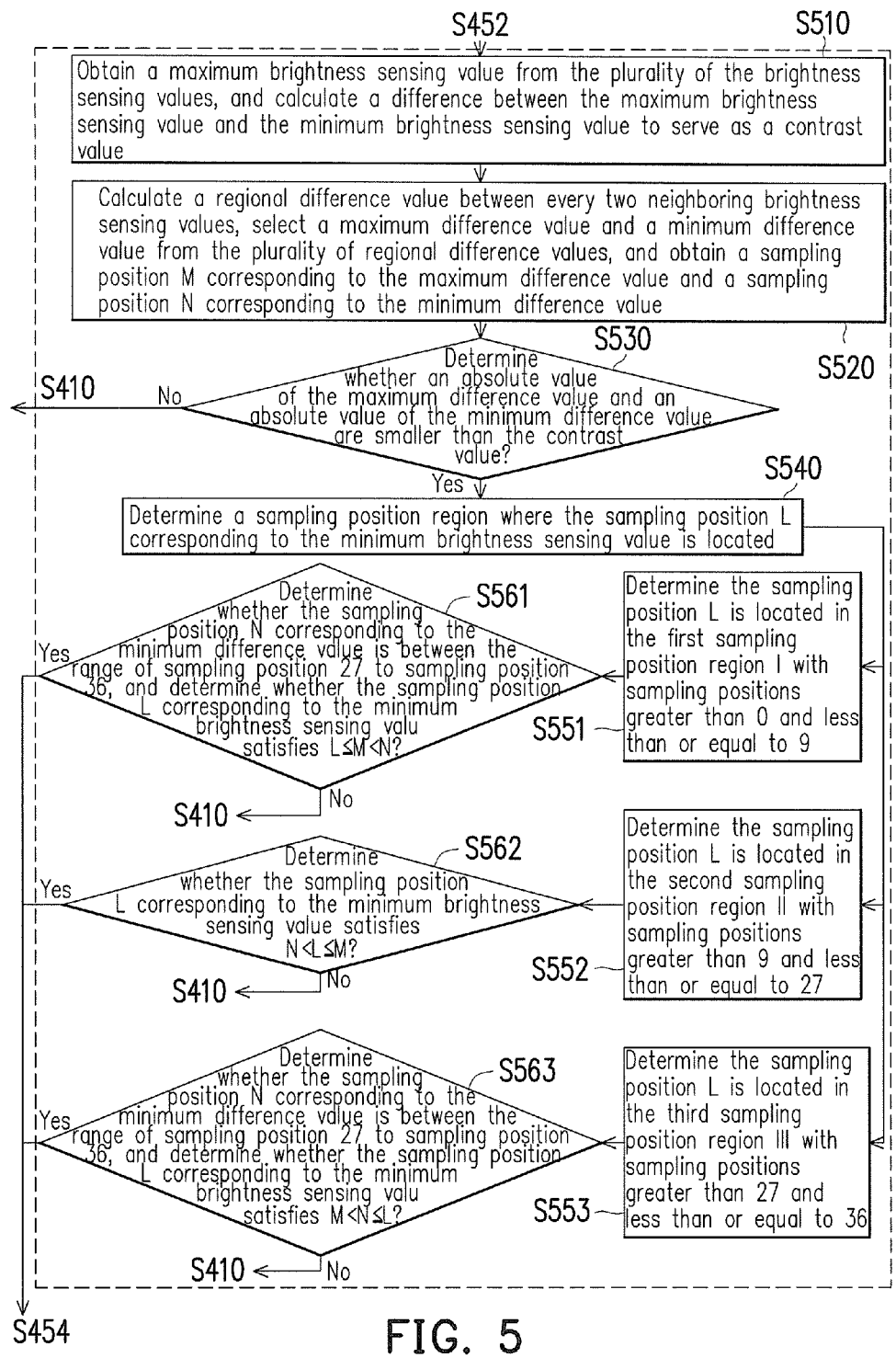
FIG. 5 is a detailed flow diagram of the Step S453 in FIG. 4 according to an embodiment of the disclosure.
Figure 6A:
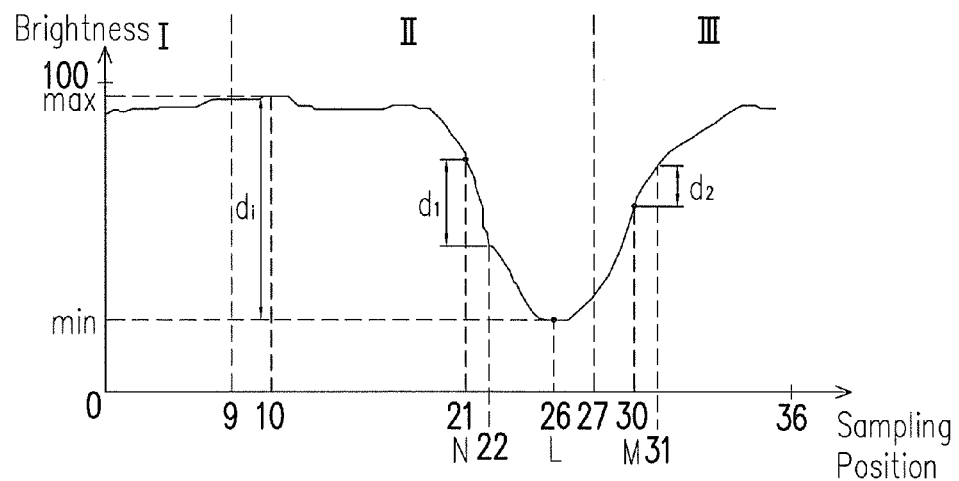
FIGS. 6A-6C are the brightness curves formed by the brightness sensing values according to an embodiment of the disclosure.
Figure 6B:
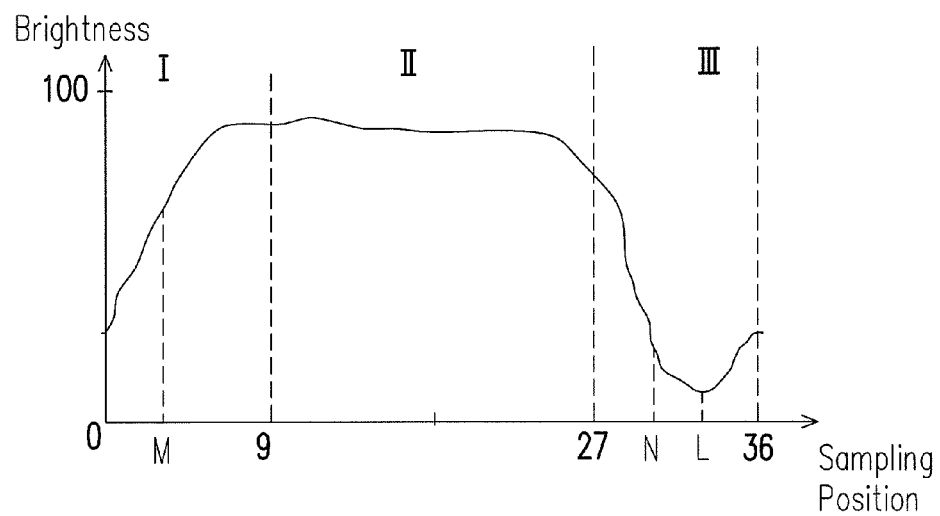
Figure 6C:
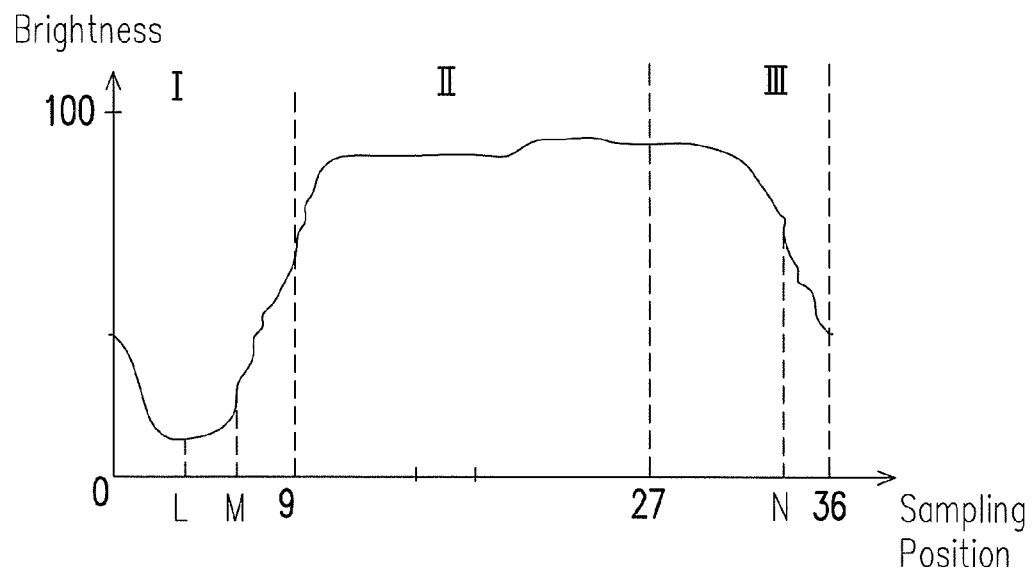

However, embodiments of the disclosure are not limited by the foregoing description, and the contents of the above embodiments may be changed in accordance with an actual requirement. For example, in one embodiment of the disclosure, all of the brightness sensing values can be used to determine whether the selected minimum brightness value is reasonable. FIG. 5 is a detailed flow diagram of the Step S453 in FIG. 4 according to an embodiment of the disclosure. Moreover, FIGS. 6A-6C are the brightness curve diagrams formed by the brightness sensing values according to an embodiment of the disclosure. In order to facilitate description and understanding, FIGS. 6A-6C are referenced to describe in detail the technical means of how the controller 310 determines whether the minimum brightness sensing value is located in the reasonable region. It should be noted that the embodiment illustrated by FIGS. 6A-6C is used only to facilitate description, and therefore the technical means of the disclosure are not limited by the listed drawings.

FIGS. 6A-6C illustrate brightness curve diagrams of a light source sensing device according to an embodiment of the disclosure, in which the vertical axis is defined as the brightness values, and the horizontal axis is defined as the sampling position. In the present embodiment, assume the brightness values are distributed between 0-100, and assume the optical sensor samples 36 times to obtain 36 brightness sensing values. Moreover, a Hilbert transform can be performed on the brightness values to eliminate noise, thereby obtaining a smoother brightness curve and preventing inaccurate minimum brightness values due to noise interference.

Please refer to FIGS. 5 and 6A. In Step S510, a maximum brightness sensing value max is obtained from the plurality of the brightness sensing values, and a difference between the maximum brightness sensing value max and the minimum brightness sensing value is calculated to serve as a contrast value di. As shown in FIG. 6A, the sampling position of the maximum brightness sensing value max is 10, and the sampling position of the minimum brightness sensing value min is 26.

Thereafter, in Step S520, a regional difference value is calculated between every two neighboring brightness sensing values. For example, a regional difference value d1 is generated by subtracting the brightness sensing value of sampling position 21 from the brightness sensing value of sampling position 22. A maximum difference value d2 and a minimum difference value d1 are then selected from the plurality of regional difference values, and a sampling position M corresponding to the maximum difference value d2 and a sampling position N corresponding to the minimum difference value d1 are obtained. In the example shown in FIG. 6A, the sampling position M corresponding to the maximum difference value d2 is 30, and the sampling position N of the minimum difference value d1 is 21.

Thereafter, in Step S530, whether an absolute value of the maximum difference value d2 and an absolute value of the minimum difference value d1 are smaller than the contrast value di is determined. If not, the optical sensor is controlled to resample. Accordingly, the generation of other peaks in the brightness curve diagram causing interference with the selection of the minimum brightness sensing value can be prevented. Moreover, by comparing the magnitudes of the sampling position M, the sampling position N, and the sampling position L, whether the sampling position L is located in the reasonable sampling region is determined. In other words, the present embodiment can further divide the sampling positions of the brightness curve diagram into a plurality of regions. Furthermore, according to a judging method of each region, whether the sampling position corresponding to the minimum brightness sensing value min is located in a reasonable region is determined.

In Step S540, a sampling position region where the sampling position L corresponding to the minimum brightness sensing value min is located is determined. In the present embodiment, the 36 sampling positions are divided into three sampling position regions, and the sampling position regions are a first sampling position region I with sampling positions greater than 0 and less than or equal to 9, a second sampling position region II with sampling positions greater than 9 and less than or equal to 27, and a third sampling position region III with sampling positions greater than 27 and less than or equal to 36, respectively. In Step S551, as shown in the example of FIG. 6C, the sampling position L is determined to be located in the first sampling position region I with sampling positions greater than 0 and less than or equal to 9, or $0<L\leq9$. In other words, the irradiating angle of the light source is between 0 to 90 degrees. Thereafter, in Step S561, whether the sampling position N corresponding to the minimum difference value is between the range of sampling position 27 to sampling position 36 is determined. In other words, whether the sampling position N satisfies $27<N\leq36$, and whether the sampling position L corresponding to the minimum brightness sensing value min satisfies $L\leq M<N$ are determined. If the determination of Step S561 is yes, then this represents the sampling position L corresponding to the minimum brightness sensing value min is located in a reasonable region. Step S454 is subsequently performed to obtain the irradiating angle of the light source using the minimum brightness sensing value min. If the sampling position L corresponding to the minimum brightness sensing value min is not located in the reasonable region, then Step S410 is subsequently performed to restart the motor and to resample.

On the other hand, in Step S552, as shown in the example of FIG. 6A, the sampling position L is determined to be located in the second sampling position region II with sampling positions greater than 9 and less than or equal to 27, or $9<L\leq27$. In other words, the irradiating angle of the light source is between 90 to 270 degrees. Thereafter, in Step S562, whether the sampling position L corresponding to the minimum brightness sensing value min satisfies $N<L\leq M$ is determined. If the determination of Step S562 is yes, then this represents the sampling position L corresponding to the minimum brightness sensing value min is located in a reasonable region. For example, as shown in FIG. 6A, the sampling position (L=26) corresponding to the minimum brightness sensing value min is between the sampling position (M=30) corresponding to the maximum difference value d2 and the sampling position (N=21) corresponding to the minimum difference value d1, and this represents the sampling position L corresponding to the minimum brightness sensing value min is located in a reasonable region.

In other words, the minimum brightness difference value d1 is a negative value, which represents the minimum brightness difference value d1 is located in a descending region of the brightness curve. The maximum brightness difference value d2 is a positive value, which represents the maximum brightness difference value d2 is in an ascending region of the brightness curve. Accordingly, whether the sampling location L corresponding to the minimum brightness value min is located between the descending curve and the ascending curve of the brightness curve can be determined through the sampling location N and the sampling location M respectively corresponding to the maximum brightness difference value d2 and the minimum brightness difference value d1. Step S454 is subsequently performed to obtain the irradiating angle of the light source using the minimum brightness sensing value min. If the sampling position L corresponding to the minimum brightness sensing value min is not located in the reasonable region, then Step S410 is subsequently performed to restart the motor and to resample.

Moreover, in Step S553, as shown in the example of FIG. 6B, the sampling position L is determined to be located in the third sampling position region III with sampling positions greater than 27 and less than or equal to 36, or $27<L\leq36$. In other words, the irradiating angle of the light source is between 270 to 360 degrees. Thereafter, in Step S563, whether the sampling position N corresponding to the minimum difference value is between the range of sampling position 27 to sampling position 36 is determined. In other words, whether the sampling position N satisfies $27<N\leq36$, and whether the sampling position L corresponding to the minimum brightness sensing value min satisfies $M<N\leq L$ are determined. If the determination of Step S563 is yes, then this represents the sampling position L corresponding to the minimum brightness sensing value min is located in a reasonable region. Step S454 is subsequently performed to obtain the irradiating angle of the light source using the minimum brightness sensing value min. If the sampling position L corresponding to the minimum brightness sensing value min is not located in the reasonable region, then Step S410 is subsequently performed to restart the motor and to resample.

Figure 7:
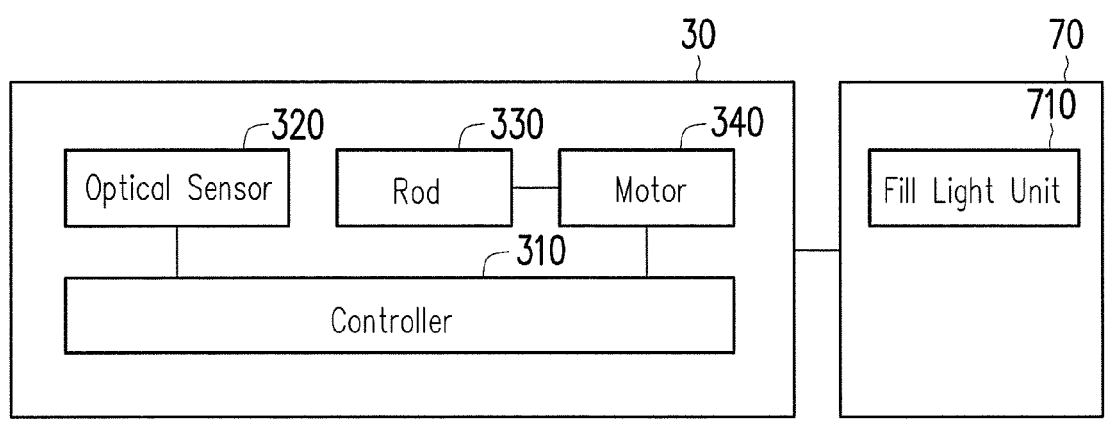
FIG. 7 is a block diagram of a light source sensing device and an image capturing device according to an embodiment of the disclosure.

It should be noted that, the light source sensing device according to embodiments of the disclosure may be applied on an image capturing device. FIG. 7 is a block diagram of a light source sensing device and an image capturing device according to an embodiment of the disclosure. With reference to FIG. 7, the coupling relationships between each element in the light source sensing device 30 can be known with reference to the description of FIG. 3, and therefore further elaboration thereof is omitted. It should be noted that, the light source sensing device 30 is coupled to an image capturing device 70, and the image capturing device 70 includes a fill light unit 710. The image capturing device 70 may be a camera, a digital camera, a video camera, or a mobile phone or smartphone having camera functions.

In a typical photo shooting environment, the light source cannot irradiate the object to be captured at the optimal irradiating angle each time. Therefore, the light source sensing device 30 in embodiments of the disclosure can be coupled to the image capturing device 70, and the controller 310 of the light source sensing device 30 can determine whether the contrast value di is greater than a threshold value. The threshold value can be set according to an actual situation, and the disclosure is not limited thereto. For example, the strength of the light source in the environment of the image capturing device can be used to set a suitable threshold value. If the contrast value di is greater than the threshold value, the controller 310 of the light source sensing device 30 can directly or indirectly enable the fill light unit 710 of the image capturing device 70 through other elements of the image capturing device 70, and adjust a fill light direction of the fill light unit 710 according to the irradiating angle of the light source. For example, in the embodiment illustrated by FIG. 7, when the contrast value di is greater than 60, the controller 310 of the light source sensing device 30 can directly or indirectly enable the fill light unit 710 of the image capturing device 70. In other words, the light source sensing device 30 allows the image capturing device 70 to obtain the irradiating angle of the light source, and accordingly adjust the fill light unit 710 (e.g. flashlight lamp) or optical elements such as polarizers, such that the image capturing device 70 can capture preferable images.

Figure 8A:
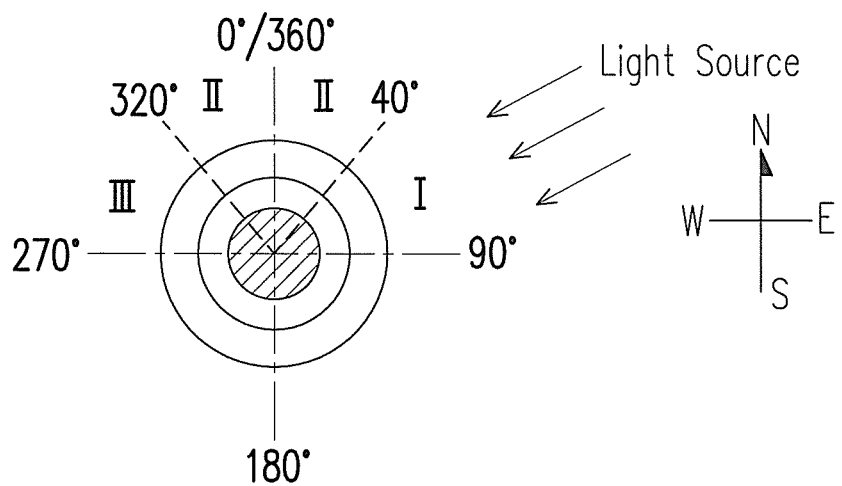
FIG. 8A is a simplified schematic view of an irradiating angle of a light source according to another embodiment of the disclosure.
Figure 8B:
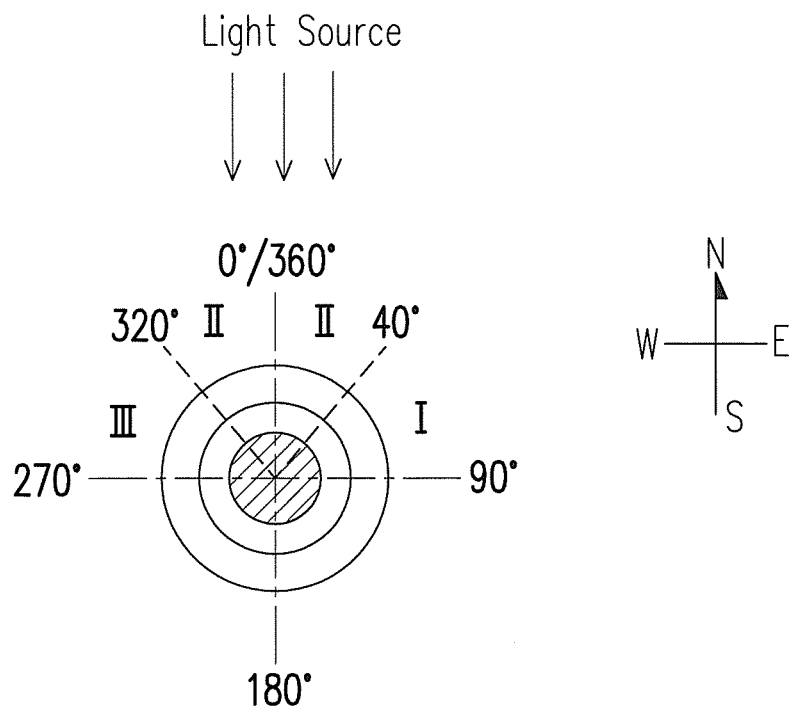
FIG. 8B is a simplified schematic view of an irradiating angle of a light source according to another embodiment of the disclosure.

FIGS. 8A and 8B are simplified schematic views of an irradiating angle of a light source according to another embodiment of the disclosure. The application environment shown in FIGS. 8A and 8B can be known with reference to the related description of FIGS. 1-7. Referring to FIGS. 8A and 8B, the actual angular settings are shown in FIGS. 8A and 8B, and it is assumed that the user of the image capturing device is located at an angular position of 180 degrees and is shooting facing north. With reference to FIG. 8A, when the light source sensing device determines the irradiating angle of the light source is between 40-90 degrees, this represents the light source is incident in the light source sensing device from the direction of the I region. That is, light is coming from the east northeast or northeast direction. In short, for the user of the image capturing device, light is coming from a direction toward the right side. If the contrast value di calculated by the light source sensing device is greater than the threshold value, this represents the object to be captured is partially facing away from the light source, and a large contrast with the ambient light exists. At this time, the image capturing device enables the fill light unit to fill the light on a side of the object to be captured which has insufficient illumination. In other words, the fill light operation is performed on a direction toward the left side of the user of the image capturing device.

With reference to FIG. 8B, when the light source sensing device determines the irradiating angle of the light source is between 0-40 degrees or 320-360 degrees, this represents the light source is incident in the light source sensing device from the direction of the II region. That is, light is coming from the north direction. In short, for the user of the image capturing device, light is coming from the front. Moreover, if the contrast value di calculated by the light source sensing device is greater than the threshold value, this represents the object to be captured is facing away from the light source, and a large contrast with the ambient light exists. At this time, the image capturing device enables the fill light unit to fill the light on the object to be captured.

Similarly, when the light source sensing device determines the irradiating angle of the light source is between 270-320 degrees, this represents the light source is incident in the light source sensing device from the direction of the III region. That is, light is coming from the west northwest or northwest direction. In short, for the user of the image capturing device, light is coming from a direction toward the left side. If the contrast value di calculated by the light source sensing device is greater than the threshold value, this represents the object to be captured is partially facing away from the light source, and a large contrast with the ambient light exists. At this time, the image capturing device enables the fill light unit to fill the light on a side of the object to be captured which has insufficient illumination. In other words, the fill light operation is performed on a direction toward the right side of the user of the image capturing device. However, the numerical values used in the embodiments above are merely exemplary, and should not be construed as limiting the disclosure.

In view of the foregoing, in the light source sensing devices and light source sensing methods according to embodiments of the disclosure, only simple detection devices are needed to determine the irradiating angle of the light source by using the lighting brightness sensed by the optical sensor, and accordingly obtain the positional information of the light source. Moreover, in the methods of finding the minimum brightness sensing value from a plurality of brightness sensing values, embodiments of the disclosure further determine whether the selected minimum brightness value is reasonable by using the brightness sensing values other than minimum brightness sensing value. Accordingly, besides ensuring that the reasonable minimum brightness value can be found, the detection accuracy of the irradiating angle of the light source can be enhanced. Moreover, the light source sensing device according to embodiments of the disclosure can complement the image capturing device. Preferable photo capturing results can be generated by analyzing the requirements in the photo capturing environment to provide the light source.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:
1. A light source sensing device, comprising:
an optical sensor sensing a lighting brightness emitted by a light source;

a rod disposed on a circular track which surrounds the optical sensor, wherein when the light source irradiates the rod, a shadow is formed on a sensing surface of the optical sensor;

a motor driving the rod to move along the circular track in a moving speed; and a controller coupled to the motor and the optical sensor, the controller controlling the optical sensor to sample in a sampling frequency during a sampling period for obtaining a plurality of brightness values, and the controller calculating and processing the brightness values for obtaining an irradiating angle of the light source.

2. The light source sensing device of claim 1, wherein:

the controller quantifies the brightness values for obtaining a plurality of brightness sensing values, and obtaining a minimum brightness sensing value from the plurality of brightness sensing values, the controller determining whether a sampling position L corresponding to the minimum brightness sensing value is located in a reasonable sampling region, and if yes, the controller calculates the irradiating angle of the light source according to the sampling position L.

3. The light source sensing device of claim 2, wherein:

the controller obtains a maximum brightness sensing value from the plurality of the brightness sensing values, and the controller calculates a difference between the maximum brightness sensing value and the minimum brightness sensing value to serve as a contrast value.

4. The light source sensing device of claim 3, wherein:

the controller calculates a regional difference value between every two neighboring brightness sensing values, and the controller selects a maximum difference value and a minimum difference value from the plurality of regional difference values, and simultaneously obtains a sampling position M corresponding to the maximum difference value and a sampling position N corresponding to the minimum difference value, the controller determining whether an absolute value of the maximum difference value and an absolute value of the minimum difference value are smaller than the contrast value, and if not, the controller controls the optical sensor to resample in the sampling frequency.

5. The light source sensing device of claim 4, wherein:

the controller compares the magnitudes of the sampling position M, the sampling position N, and the sampling position L, and the controller accordingly determines whether the sampling position L is located in the reasonable sampling region.

6. The light source sensing device of claim 3, wherein the light source sensing device is coupled to an image capturing device, wherein:

the controller determines whether the contrast value is greater than a threshold value, if the contrast value is greater than the threshold value, the controller enables a fill light unit of the image capturing device and adjusts a fill light direction of the fill light unit according to the irradiating angle of the light source.

7. The light source sensing device of claim 2, wherein:

the controller performs a Hilbert transform on the brightness values to eliminate noise and then a quantification process is performed on the noise removed brightness values.

8. The light source sensing device of claim 2, wherein:

the controller calculates a regional difference value between every two neighboring brightness sensing values, and the controller selects a maximum difference value and a minimum difference value from the plurality of regional difference values, and simultaneously obtains a sampling position M corresponding to the maximum difference value and a sampling position N corresponding to the minimum difference value; and the controller compares the magnitudes of the sampling position M, the sampling position N, and the sampling position L, and the controller accordingly determines whether the sampling position L is located in the reasonable sampling region.

9. A light source sensing method, adapted for a light source sensing device having an optical sensor, the optical sensor sensing a lighting brightness emitted by a light source, the light source sensing method comprising:

driving a rod to move along a circular track which surrounds the optical sensor, wherein when the light source irradiates the rod, a shadow is formed on a sensing surface of the optical sensor;

sampling the sensed lighting brightness in a sampling frequency during a sampling period with the optical sensor for obtaining a plurality of brightness values; and calculating and processing the brightness values for obtaining an irradiating angle of the light source.

10. The light source sensing method of claim 9, wherein the step of calculating and processing the brightness values for obtaining the irradiating angle of the light source comprises:

quantifying and analyzing the brightness values to obtain a plurality of brightness sensing values;

obtaining a minimum brightness sensing value from the plurality of brightness sensing values;

determining whether a sampling position L corresponding to the minimum brightness sensing value is located in a reasonable sampling region; and if yes, calculating the irradiating angle of the light source according to the sampling position L, and if not, controlling the optical sensor to resample in the sampling frequency.

11. The light source sensing method of claim 10, wherein after the step of obtaining the brightness sensing values, the method further comprises:

obtaining a maximum brightness sensing value from the plurality of brightness sensing values; and calculating a difference between the maximum brightness sensing value and the minimum brightness sensing value to serve as a contrast value.

12. The light source sensing method of claim 11, wherein after obtaining the contrast value, the method further comprises:

calculating a regional difference value between every two neighboring brightness sensing values, and selecting a maximum difference value and a minimum difference value from the plurality of regional difference values, and obtaining a sampling position M corresponding to the maximum difference value and a sampling position N corresponding to the minimum difference value; and determining whether an absolute value of the maximum difference value and an absolute value of the minimum difference value are smaller than the contrast value, and if not, controlling the optical sensor to resample in the sampling frequency.

13. The light source sensing method of claim 12, if the absolute value of the maximum difference value and the absolute value of the minimum difference value are smaller than the contrast value, the step of determining whether the sampling position L corresponding to the minimum brightness sensing value is located in the reasonable sampling region comprises:

comparing the magnitudes of the sampling position M, the sampling position N, and the sampling position L, and accordingly determining whether the sampling position L is located in the reasonable sampling region.

14. The light source sensing method of claim 11, further comprising:
  determining whether the contrast value is greater than a threshold value; and
  if the contrast value is greater than the threshold value, enabling a fill light unit of an image capturing device, and adjusting a fill light direction of the fill light unit according to the irradiating angle of the light source.

15. The light source sensing method of claim 10, wherein before the step of quantifying and analyzing the brightness values, the method further comprises:
  performing a Hilbert transform on the brightness values to remove noise.

16. The light source sensing method of claim 10, wherein the step of determining whether the sampling position L corresponding to the minimum brightness sensing value is located in the reasonable sampling region comprises:
  calculating a regional difference value between every two neighboring brightness sensing values, and selecting a maximum difference value and a minimum difference value from the plurality of regional difference values, and obtaining a sampling position M corresponding to the maximum difference value and a sampling position N corresponding to the minimum difference value; and
  comparing the magnitudes of the sampling position M, the sampling position N, and the sampling position L, and accordingly determining whether the sampling position L is located in the reasonable sampling region.

* * * * *